Patented Dec. 9, 1941

2,265,665

UNITED STATES PATENT OFFICE 2,265,665

CEMENTING MATERIAL

Charles A. Meek, Berkeley, Calif., assignor to Resistall Corporation, San Francisco, Calif., a corporation of California No Drawing. Application March 26, 1938, Serial No. 198,272

3 Claims. (Cl. 106—100)

This invention relates to a quick-setting cement of the Portland type.

The object of my invention is the provision of a quick-setting, high magnesia content cement.

Portland cement may be regarded as being entirely an artificial product, obtained by burning to semi-fusion an intimate mixture of pulverized lime, silica, alumina, and iron, and finely grinding the resulting clinker. Magnesia is usually present in the lime but in practice is limited to not more than 5% on the theory that at best it is inert and a valueless constituent. Many operators regard magnesia as positively detrimental in even small amounts.

I have found that an excellent high magnesia content cement can be produced by burning to semi-fusion a finely ground intimate mixture of lime and the mineral antigorite, and activating the resulting clinker by grinding in accordance with the usual practice. Burning is effected at temperatures ranging from 2000° F. to 3000° F.

Antigorite is one of the minerals occurring in serpentine rock and having the chemical composition $H_4Mg_3Si_2O_9$ or possibly $2H_2O \cdot 3MgO \cdot 2SiO_2$. Pure antigorite is generally observed to be dense and resistant in appearance, greenish black in color, and to have a brittle, splintery fracture. Microscopically it consists of an aggregation of minute lamellar plates. It is not to be confused with other hydrous magnesium silicates occurring in serpentine rock which in chemical composition may be identical but physically quite different although it is to be understood that chrysotile is one form of antigorite.

Satisfactory results have been obtained by using a mixture containing 55% lime and 45% antigorite which upon being fused results in a clinker having approximately the following composition:

| | Per cent |
|---|---|
| CaO | 50 |
| SiO | 23 |
| MgO | 21 |
| $Fe_2O_3$ | 4½ |
| Impurities | 1½ |

Although a chemical analysis of the clinkered product gives the above composition, little or nothing can be said as to the real constitution of the resulting product other than that the magnesia appears to have entered into chemical combination with the other ingredients to produce a quick-setting, hydraulic cement having a magnesia content of from 15% to 20% higher than that tolerated in normal Portland cements and, depending upon the character of the raw materials used, a small percentage of aluminum and iron oxides will be present.

According to the usual practice, a retarding agent such as gypsum may be added in order to control the setting time and strength of the final product.

The addition of 25% to 29% by weight of water produces a plastic workable mass suitable for use in the same manner as Portland cement.

Although for the purposes of illustration a mixture of 55% lime and 45% antigorite has been used, these percentages are not critical and may be varied through a considerable range.

It is recognized that high magnesia content cements have been made in the past by the addition of the magnesia as magnesium carbonate and by burning at temperatures considerably below the temperatures normally used in the manufacture of Portland cement (2700° F. to 3000° F.). The magnesia in these products, however, is dead burnt and therefore inert.

For the purpose of this specification, limes and magnesia are designated as carbonate cementing materials.

I claim:

1. A hydraulic cement obtained by finely grinding a clinker resulting from the semi-fusion of an intimate mixture of lime and substantially pure antigorite.

2. A hydraulic cement obtained by finely grinding a clinker resulting from the semi-fusion of an intimate mixture of lime and substantially pure antigorite, the antigorite forming a substantial portion of the mixture.

3. A hydraulic cement comprising a finely ground clinker resulting from the semi-fusion of an intimate mixture of approximately 55% lime and 45% antigorite.

CHARLES A. MEEK.